US008860369B2

(12) United States Patent
Zyren

(10) Patent No.: US 8,860,369 B2
(45) Date of Patent: *Oct. 14, 2014

(54) PHASE CONTROL BASED ON TRANSMISSION LINE DIRECTIONAL AWARENESS

(71) Applicant: QUALCOMM Incorporated, San Diego, CA (US)

(72) Inventor: James G. Zyren, Melbourne Beach, FL (US)

(73) Assignee: QUALCOMM Incorporated, San Diego, CA (US)

(*) Notice: Subject to any disclaimer, the term of this patent is extended or adjusted under 35 U.S.C. 154(b) by 12 days.

This patent is subject to a terminal disclaimer.

(21) Appl. No.: 13/712,876

(22) Filed: Dec. 12, 2012

(65) Prior Publication Data
US 2013/0099743 A1 Apr. 25, 2013

Related U.S. Application Data

(63) Continuation of application No. 12/421,452, filed on Apr. 9, 2009, now Pat. No. 8,368,349.

(60) Provisional application No. 61/043,581, filed on Apr. 9, 2008.

(51) Int. Cl.
*H02J 7/00* (2006.01)
*G06Q 50/06* (2012.01)

(52) U.S. Cl.
CPC .............. *H02J 7/0042* (2013.01); *G06Q 50/06* (2013.01); *Y02T 10/7055* (2013.01); *H02J 7/0027* (2013.01); *Y10S 307/01* (2013.01)
USPC ...................................... 320/109; 307/DIG. 1

(58) Field of Classification Search
USPC ............ 320/107, 109; 340/538, 12.32, 13.23; 307/DIG. 1; 370/206, 338, 516; 327/1, 327/2, 3, 4, 7
See application file for complete search history.

(56) References Cited

U.S. PATENT DOCUMENTS 2,931,901 A 4/1960 Markusen
4,084,133 A 4/1978 Zimmer et al.
(Continued)

FOREIGN PATENT DOCUMENTS

WO  WO-2006012681   2/2006
WO  WO-2006047270   5/2006
WO  WO-2006118850   11/2006

OTHER PUBLICATIONS

Co-pending U.S. Appl. No. 13/712,876, filed Dec. 12, 2012, 32 pages.
(Continued)

*Primary Examiner* — Yalkew Fantu
*Assistant Examiner* — Manuel Hernandez
(74) *Attorney, Agent, or Firm* — DeLizio Gilliam, PLLC

(57) ABSTRACT

An apparatus includes multiple taps coupled to a power line segment. The apparatus also includes circuitry coupled to a charging station and coupled to the multiple taps, with the circuitry being configured to discriminate between communication signals propagating on a power line segment in the direction from the first end to a second end of the power line segment and communication signals propagating on the power line segment in the direction from the second end to the first end. The circuitry includes a signal processing unit in communication with each of the taps, wherein the signal processing unit is configured to control a phase for at least a portion of a signal for at least a first of the taps relative to a phase for a corresponding portion of the signal for at least a second of the taps.

35 Claims, 6 Drawing Sheets

(56) References Cited

U.S. PATENT DOCUMENTS

| | | |
|---|---|---|
| 4,864,589 A | 9/1989 | Endo |
| 4,876,549 A | 10/1989 | Masheff |
| 5,398,542 A | 3/1995 | Vasbinder |
| 5,497,142 A | 3/1996 | Chaffanjon |
| 5,724,047 A | 3/1998 | Lioio et al. |
| 6,281,841 B1 | 8/2001 | Nevill |
| 6,300,881 B1 | 10/2001 | Yee et al. |
| 6,313,795 B1 | 11/2001 | Herrmann et al. |
| 7,307,512 B2 | 12/2007 | Yaney et al. |
| 7,414,962 B2 | 8/2008 | Izumi |
| 7,701,325 B2 | 4/2010 | White |
| 8,368,349 B2 | 2/2013 | Zyren |
| 8,368,351 B2 | 2/2013 | Zyren |
| 2003/0039317 A1 | 2/2003 | Taylor et al. |
| 2003/0169155 A1 | 9/2003 | Mollenkopf et al. |
| 2004/0227622 A1 | 11/2004 | Giannini et al. |
| 2006/0087346 A1 | 4/2006 | Ishida et al. |
| 2006/0259254 A1 | 11/2006 | Swarztrauber et al. |
| 2007/0135085 A1 | 6/2007 | Iwamura |
| 2008/0040296 A1 | 2/2008 | Bridges et al. |
| 2008/0096500 A1 | 4/2008 | Eilts et al. |
| 2009/0212762 A1 | 8/2009 | Van Oevelen et al. |
| 2009/0261779 A1 | 10/2009 | Zyren |
| 2009/0290650 A1 | 11/2009 | Zyren |
| 2010/0274697 A1 | 10/2010 | Zyren |

OTHER PUBLICATIONS

"HomePlug AV White Paper", HomePlug Powerlone Alliance Inc., Doc. Ver. No. HPAVWP—050818 Aug. 2005, 11 pages.

"U.S. Appl. No. 12/421,452 Office Action", Jan. 24, 2012, 18 pages.

"U.S. Appl. No. 12/421,543 Final Office Action", Oct. 18, 2012, 25 pages.

"U.S. Appl. No. 12/421,543 Office Action", May 24, 2012, 23 pages.

International Search Report and Written Opinion in PCT Application No. PCT/US2009/040078, dated Jun. 5, 2009, 12 pages.

PHASE CONTROL BASED ON TRANSMISSION LINE DIRECTIONAL AWARENESS

CROSS-REFERENCE TO RELATED APPLICATIONS

This application is a continuation of U.S. application Ser. No. 12/421,452 filed Apr. 9, 2009, which claims benefit of U.S. Application Ser. No. 61/043,581, filed on Apr. 9, 2008, incorporated herein by reference.

TECHNICAL FIELD

The invention relates to directional awareness for detecting electromagnetic signals propagating on a transmission line.

BACKGROUND

Power Line Communications (PLC) is a rapidly growing market. PLC is attractive because it uses existing power lines that are ubiquitous in homes and businesses around the world. PLC products have proven to be very successful for in-home data distribution. Other market segments such as Smart Grid (power utilities controlling power distribution infrastructure and major electrical loads) and Access BPL (use of power lines to provide high speed internet access to customers not served by cable or DSL) call for broadband data to be transmitted to homes and businesses over outdoor power lines.

SUMMARY

In one aspect, in general, an apparatus is described for coupling a charging station to a power line segment that is terminated at a first end by a charging terminal. The apparatus includes multiple taps coupled to the power line segment; and circuitry coupled to the charging station and coupled to the multiple taps, with the circuitry being configured to discriminate between communication signals propagating on the power line segment in the direction from the first end to a second end of the power line segment and communication signals propagating on the power line segment in the direction from the second end to the first end.

Aspects can include one or more of the following features.

The circuitry comprises: a first adder connected to a first tap via a first transmission line and connected to a second tap via a second transmission line that is longer than the first transmission line; a second adder connected to the second tap via a third transmission line and connected to the first tap via a fourth transmission line that is longer than the third transmission line; and a comparator with inputs connected to an output of the first adder and an output of the second adder.

The charging station is a vehicle charging station that provides power to a vehicle connected to the charging terminal.

The charging station is configured to determine billing information from received communication signals propagating on the power line segment in the direction from the first end to the second end.

The charging station is configured to determine billing information from communication signals transmitted by a vehicle connected to the charging terminal.

The second tap is spaced a distance D from the first tap on the power line segment.

The second transmission line is longer than the first transmission line by approximately the distance D and the fourth transmission line is longer than the third transmission line by approximately the distance D.

The distance D is approximately one fourth of the wavelength of at least one carrier frequency of the communication signals.

The distance D is between about one fourth and one tenth of the wavelength of at least one carrier frequency of the communication signals.

The distance D is less than about one tenth of the wavelength of the highest carrier frequency of the communication signals.

The first adder comprises a filter configured to produce a slowly varying estimate of the amplitude of the sum of the communications signals at the inputs of the first adder, and the second adder comprises a filter configured to produce a slowly varying estimate of the amplitude of the sum of the communications signals at the inputs of the second adder.

The output of the first adder is rectified and lowpass filtered and the output of the second adder is rectified and lowpass filtered.

The circuitry comprises: a signal processing unit in communication with each of the taps, wherein the signal processing unit is configured to control a phase for at least a portion of a signal for at least a first of the taps relative to a phase for a corresponding portion of the signal for at least a second of the taps.

Controlling the phase for the portion of the signal for the first of the taps comprises determining the phase based at least in part on a direction in which a signal is to be coupled between the taps and the power line segment.

Controlling the phase for the portion of the signal for the first of the taps comprises determining a sign of the phase based at least in part on the direction.

The signal processing unit is further configured to control an amplitude of the portion of the signal from the first of the taps relative to an amplitude of a corresponding portion of the signal from the second of the taps.

The signal comprises multiple subcarriers, and the signal processing unit is configured to determine a phase for each subcarrier for at least a first of the taps relative to a phase for a corresponding subcarrier for at least a second of the taps.

The corresponding subcarrier for the second of the taps has the same frequency as the subcarrier for the first of the taps.

The signal processing unit is configured to determine a phase and an amplitude for each subcarrier for the first of the taps relative to a phase and an amplitude of a corresponding subcarrier for the second of the taps.

The apparatus further comprises multiple transceivers each coupled to a respective one of the taps and coupled to the signal processing unit.

The apparatus further comprises a transceiver coupled to each of the taps and coupled to the signal processing unit.

Controlling the phase for the portion of the signal for the first of the taps comprises controlling the phase to be approximately equal to a difference between a constant term and a term proportional to a frequency of the portion of the signal and a distance between the first and second taps.

The frequency of the portion of the signal corresponds to a frequency at a peak of a spectrum of the portion of the signal.

The portion of the signal comprises a subcarrier of the signal.

The distance between the first and second taps is proportional to a center wavelength corresponding to a center of a bandwidth over which a spectrum of the signal spans.

The distance between the first and second taps is approximately equal to the center wavelength divided by four.

Controlling the phase for the portion of the signal for the first of the taps comprises determining a phase that provides at least a partial null in an array factor for signals coupled between a power line segment and first and second taps in one direction on the power line segment.

The determined phase provides gain in the array factor for signals coupled between the power line segment and the first and second taps in the opposite direction on the power line segment.

The signal processing unit is configured to determine a signal strength for each subcarrier for a specified direction on the power line segment and to determine amplitudes and phases for each subcarrier for each of the taps that provide at least a partial null in the array factor for the specified direction.

The signal processing unit is configured to receive signals from the power line segment to the first and second taps according to the array factor.

The signal processing unit is configured to: determine a first set of phase values for processing each subcarrier of a first signal received from the first tap; and determine a second set of phase values for processing each subcarrier of a second signal received from the second tap based on the first set of phase values.

The signal processing unit is configured to receive the first signal from the first tap and receive the second signal from the second tap at approximately the same time.

The signal processing unit is configured to process a subcarrier of the first signal using a phase value from the first set of phase values to recover a first vector, process a corresponding subcarrier of the second signal using a phase value from the second set of phase values to recover a second vector, and combine the first and second vectors according to a relative phase to recover a data value.

The signal processing unit is configured to control the relative phase according to a direction in which the data value is being received from a power line segment coupled to the taps.

The signal processing unit is configured to simultaneously receive a first signal from one direction on a power line segment coupled to the taps and receive a second signal different from the first signal from another direction on the power line segment.

In another aspect, in general, a method for coupling a charging station to a power line segment that is terminated at a first end by a charging terminal comprises sensing a communication signal propagating on the power line and being coupled from multiple taps connected to the power line segment; and determining if the communication signal is propagating on the power line segment in the direction from the first end to a second end of the power line segment or in the direction from the second end to the first end.

Aspects can include one or more of the following features.

The charging station is a vehicle charging station that provides power to a vehicle connected to the charging terminal.

The communication signal includes billing information transmitted from a vehicle connected to the charging terminal.

The second end is connected to a power distribution network.

The communication signal includes billing information transmitted from a vehicle connected to the charging terminal.

The communication signal includes billing information transmitted from a server connected the power distribution network.

The method further comprises: adding a signal from a first tap to a signal from a second tap spaced a distance D on the power line segment from the first tap using an adder positioned near the first tap to produce a first adder output signal; adding a signal from the first tap to a signal from the second tap using an adder positioned near the second tap to produce a second adder output signal; and comparing the amplitude of the first adder output signal to the amplitude of the second adder output signal to determine in which direction on the power line segment the communication signal is propagating.

The distance D is approximately one fourth of the wavelength of at least one carrier frequency of the communication signal.

The distance D is between about one fourth and one tenth of the wavelength of at least one carrier frequency of the communication signal.

The distance D is less than about one tenth of the wavelength of the highest carrier frequency of the communication signal.

The amplitudes are compared by rectifying and lowpass filtering the outputs of the first and second adders and comparing the two resulting outputs.

The method further comprises adjusting the phase of at least a portion of the communication signal detected at a first tap relative to the phase of a corresponding portion of the communication signal detected at a second tap, and adding the phase adjusted signal from the first tap to the signal detected at the second tap to suppress signals propagating on the power line segment in the direction from the second end of the power line segment to the first end of the power line segment.

In another aspect, in general, an apparatus for coupling a charging station to a power line segment that is terminated at a first end by a charging terminal includes multiple taps coupled to the power line segment, and circuitry in communication with each of the taps, with the circuitry being configured to control a phase for at least a portion of a signal for at least a first of the taps relative to a phase for a corresponding portion of the signal for at least a second of the taps.

Aspects can include one or more of the following features.

The circuitry comprises a first transmission line coupled to a first tap and a second transmission line coupled to a second tap that is longer than the first transmission line by approximately the distance between the first and second taps for controlling the phase for at least a portion of a signal for the first tap relative to a phase for a corresponding portion of the signal for the second tap.

The circuitry is configured to discriminate between communication signals propagating on the power line segment in the direction from the first end to a second end of the power line segment and communication signals propagating on the power line segment in the direction from the second end to the first end.

The circuitry comprises a first receiver coupled to the first tap and a second receiver coupled to the first tap and circuitry for shifting the phase of an output of at least one of the receivers for controlling the phase for at least a portion of a signal for the first tap relative to a phase for a corresponding portion of the signal for the second tap.

The circuitry is configured to discriminate between communication signals propagating on the power line segment in the direction from the first end to a second end of the power line segment and communication signals propagating on the power line segment in the direction from the second end to the first end.

In another aspect, in general, a method comprises delivering power to a vehicle via a power line segment connected to the vehicle through a charging terminal at a first end of the power line segment; receiving a first communication signal including billing information from the vehicle that is propagating on the power line segment in the direction from the first end; and discriminating between the first communication signal and a second communication signal including billing information that is propagating on the power line segment in the direction from a second end of the power line segment not connected to the vehicle to the first end.

Aspects can include one or more of the following features.

The first and second communication signals are discriminated by a charging station that is connected to the power line segment via multiple taps.

Discriminating between the first and second communication signals comprises determining in which direction on the power line segment a sensed communication signal is propagating.

The method further comprises steering a receiver null of the charging station to substantially suppress communication signals propagating on the power line segment in the direction from the second end to the first end.

Among the many advantages of the invention (some of which may be achieved only in some of its various aspects and implementations) are the following.

Directional awareness techniques facilitate the use of PLC for electric or hybrid vehicle charging stations with integrated billing. A substantial deployment of electric vehicles calls for the development of power charging infrastructure to service those vehicles and enhance their range. Charging stations in parking lots and other public places have the potential to conveniently meet that demand.

Billing for power drawn at charging stations can be efficiently implemented by transmitting billing signals over the power distribution network itself using PLC. A PLC based billing method for an electric or hybrid vehicle charging system would have a number of advantages over alternative automated billing methods. For example, a PLC based billing method saves the cost of building out a parallel communications network to support billing and can potentially be more secure than alternative billing methods, such as those that rely on wireless communications links.

One aspect of automated billing at vehicle charging stations includes collecting vehicle or customer identification or billing authorization information and matching that information with a measurement of energy consumed at a particular charging terminal. For isolated charging terminals, there is no potential confusion since there is only one charging station that can be expected to receive the billing information transmitted by a vehicle or customer. In the case of clusters of charging stations that collect billing information over a shared communications medium, there may be potential confusion.

An exemplary PLC based solution to the bill matching problem is to have vehicles connect to a power supply through a power line segment that is monitored by a charging station with PLC capabilities and the ability to detect in which direction a PLC message is propagating on the power line segment. The ability to detect the direction of propagation for a signal on a transmission line, such as a power line can be called directional awareness. A charging station with directional awareness is able to distinguish messages sent over the power line by a vehicle connected to its charging terminal from PLC messages sent by other nodes connected to the same power line serving a cluster of charging stations. By identifying messages from vehicles at its terminal, the charging station matches that information to energy consumption that it measures and can relay the matched information as needed to other nodes in the PLC network to complete a billing transaction.

Other features and advantages of the invention will be found in the detailed description, drawings, and claims.

DETAILED DESCRIPTION

There are a great many possible implementations of the invention, too many to describe herein. Some possible implementations that are presently preferred are described below. It cannot be emphasized too strongly, however, that these are descriptions of implementations of the invention, and not descriptions of the invention, which is not limited to the detailed implementations described in this section but is described in broader terms in the claims.

Figure 1:
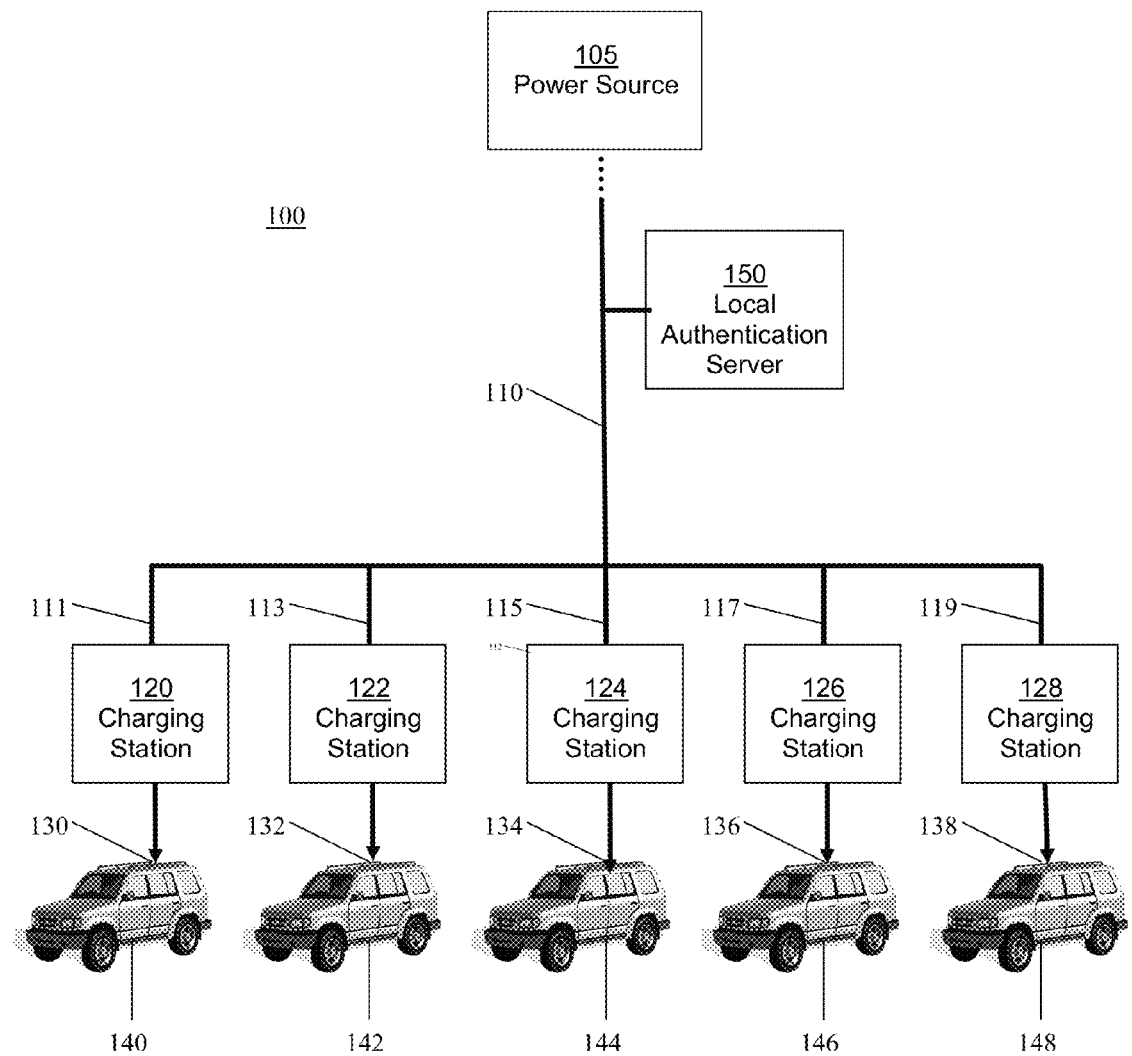
FIG. 1 is a schematic diagram of local area power distribution network supporting multiple vehicle charging stations.

A local area power distribution network 100 is depicted in FIG. 1. The network includes a power line 110, which connects the nodes in the local area network to each other and a power source 105. The power source 105 supplies power, for example, as a 120 Volt Alternating Current (120 VAC) waveform. For example, the power source 105 may include a step down transformer that couples power to the local area distribution network from a high voltage transmission line of a larger power grid. The power line 110 includes one or more power line segments 111, 113, 115, 117, and 119. Each power line segment connects at one end to the rest of the power line 110 and terminates at the other end at a charging terminal 130, 132, 134, 136, or 138. A charging terminal is an interface, such a plug, that is used to physically connect the power line to a device to be charged, such as an electric vehicle 140, 142, 144, 146, or 148. Each power line segment also passes through and connects to a charging station 120, 122, 124, 126, or 128 via two or more taps. The local area power distribution network 100 may also include a local authentication server 150 that connects to the power line 110 and is configured as PLC node capable of processing billing transactions via messages transmitted and received over the power line 110.

Each charging station (e.g., 120) is configured to measure the power supplied at its associated charging terminal (e.g., 130) through the power line segment (e.g., 111) to which it is attached. For example, a charging station may include a current transformer that measures current on the power line segment indicating the energy consumed during a charging session. The charging station is also a PLC node with directional awareness. The charging station includes PLC circuitry that is able to detect when a communication signal is being transmitted over the power line segment (e.g., by detecting a preamble and header of a data frame). When a vehicle (e.g., 140), or other device to be charged, is connected to the charging terminal, it may transmit a signal on the power line segment carrying a message that includes billing information (e.g., information identifying a vehicle or customer for the purpose of billing). This message is received by the charging station 120, which associates the billing information with energy consumption during a determined charging session via the power line segment 111. The associated billing information may be forwarded by the charging station 120 to an authentication server 150 for further processing and authentication. The charging station 120 may also receive billing information from the server 150. The determined charging session may begin after the authentication and may end, for example, when the charging terminal is disconnected, or when the measured current drops below a predetermined threshold, or after a predetermined interaction (e.g., a button press). Once charging session is complete, the measured energy consumption information along with any required billing information is transmitted to the local authentication server or another PLC node reachable via the power line 110 with the ultimate destination being a device configured to complete a billing transaction. A confirmation message, such as an electronic receipt may be received by the charging station 120 and forwarded to the charged vehicle 140.

Charging stations are able to discriminate between signals propagating in different directions on the power line segment and are therefore able to reject or ignore billing information transmitted on the power line by vehicles connected to other charging terminals. In one example, a second vehicle 142 is connected to the local area power distribution network 100 via a second charging terminal 132. When the second vehicle 142 transmits its message with billing information on the power line 110 (from the power line segment 113), the signal bearing that message could propagate to all charging terminals in the network 100. However, only the charging station 122 on its power line segment 113 will receive and process this billing information. All other charging stations 120, 124, 126, and 128 will reject or ignore the message because it will propagate to them from the network end of their respective power line segments 111, 115, 117, and 119 (as opposed to the charging terminal end).

In some implementations, the charging terminals are configured so that vehicles (e.g., 140) present a matched load at the charging terminal (e.g., 130), so reflections due to impedance mismatch at the terminal are minimized and the sensitivity of directional awareness in the charging station (e.g., 120) is maximized. When no vehicle is connected to the charging terminal, an impedance mismatch may occur. In this case the charging station may detect the absence of a connected vehicle at its terminal and use that information to reject or ignore billing information messages received while no vehicle is connected. Alternatively, there may be situations in which a vehicle is connected, but is not actively charging. The terminal to which the vehicle is connected can include circuitry to control whether a vehicle is in a charging state.

Figure 2:
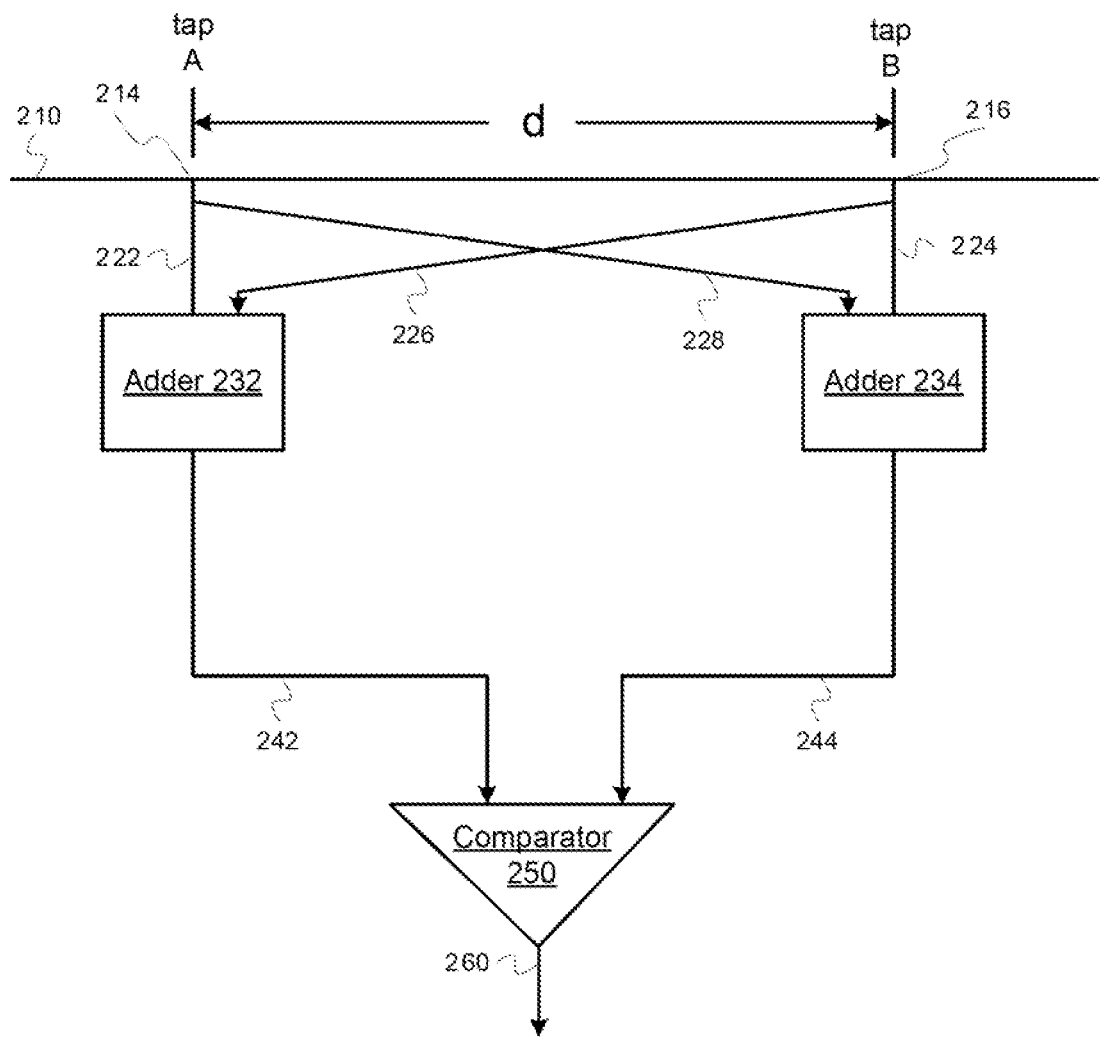
FIG. 2 is block diagram of a directional awareness sensor.

FIG. 2 shows is a block diagram of an exemplary directional awareness system 200 that may be employed in a charging station. The system 200 includes taps to couple to a power line segment 210 at two positions, Tap A 214 and Tap B 216, separated by a distance d. Tap A is connected by a transmission line 222 (e.g., any arrangement of conductors such as a cable or a pair of wires) to one input of a first adder 232 that may be positioned close to Tap A. A second input of the first adder 232 is connected to Tap B by a transmission line 226 that is longer than the first transmission line 222 by a length of approximately d. Tap B is connected an input of a second adder 234 by a third transmission line 224. A second input of the second adder 234 is connected to Tap A by fourth transmission line 228 that is longer than the third transmission line 224 by a length of approximately d. The adders 232 and 234 each add the signals detected at their inputs and produce an output signal, 242 and 244 respectively, that is proportional to the amplitude of the resulting AC waveform. For example, the adders 232 and 234 may rectify and lowpass filter the summed AC waveforms to produce their output signals. The adder output signals 242 and 244 are then passed to the inputs of a comparator 250. The output 260 of the comparator may be monitored to determine the direction in which the signal on the power line segment is propagating. When the output has positive sign (i.e., signal 242>signal 244) the signal on the power line segment is propagating in the direction from Tap B to Tap A. When the output has negative sign (i.e., signal 242<signal 244) the signal on the power line segment is propagating in the direction from Tap A to Tap B.

When the distance d is approximately one quarter of a wavelength of a given subcarrier frequency in the signal on the power line segment 210, the waveforms received at one of the adders add constructively, and the waveforms received at the other adder add destructively. For example, for a signal propagating from Tap B to Tap A, the signals arriving at the inputs of adder 232 have traveled approximately equal lengths and add constructively. Whereas the signal arriving at adder 234 over the transmission line 228 has traveled approximately 2d further than the signal arriving at adder 234 over the transmission line 224. Thus, when d is a quarter wavelength, one signal is a half wavelength out of phase, equivalent to a phase shift of π (or 180 degrees). However, even if the distance d is less than a quarter wavelength, it is still possible to distinguish the different amounts of constructive and/or destructive interference that occur between adder 232 and adder 234. For example, for a distance d of one tenth of a wavelength, the output 260 is about 20% of its value at a distance d of a quarter wavelength. Depending on the noise or distortion on the power line a distance significantly smaller than a quarter may suffice to provide adequate directional awareness for determining whether or not a message is from a local vehicle (e.g., d between about 0.25 to 0.1 of a wavelength, or d between about 0.25 to 0.05 of a wavelength). Additionally, for communication schemes that use multiple subcarrier frequencies (e.g., OFDM) any of the carrier frequencies can be used as input (e.g., using an analog or digital filter). If a higher frequency is used, then the wavelength that determines the value of d is smaller, which may help to facilitate design of a more compact charging station.

Some power line signals operate in 2-30 MHz band. However, signals can be generated at lower power levels at higher frequencies (e.g., up to 80 MHz). Use of higher frequencies would facilitate smaller tap spacing, thus reducing the overall size of the charging station. At 80 MHz, for example, a ¼ wavelength tap spacing would be about 24 inches. Smaller spacings of 12 inches or even less would be effective as well. Permissible signal levels at 80 MHz are lower than in the 2-30 MHz range, but given the short range of the charging connection and the absence of other impairments in the charging connection (e.g., transformers or fuse panels), these power levels may be adequate.

All or portions of the directional awareness system 200 other than the power line segment and the taps may be implemented with any combination of analog and/or digital circuitry. Additionally, alternative systems can provide the same phase shifts provided by the transmission lines 222, 224, 226, and 228 digitally after receiving signals from Tap A and Tap B directly and converting the analog signals into digital signals. The system 200 has the advantage that it is simple and cheap to build and can provide reliable directional awareness even for small tap separation distances that are considerably shorter that the longest wavelength components of the propagating signal, allowing for a compact charging station device.

In some implementations directional awareness is provided without necessarily providing full directional communication using PLC signals. In some implementations, circuitry for receiving and/or transmitting PLC signals over the power line segment can use one or more of the taps used in the directional awareness system. For example, the signal from the first adder 232 or the second adder 234 can be provided to a receiving circuitry to demodulate and decode a signal, as described in more detail below. Additionally, a signal can be transmitted over the power line segment using circuitry (not shown) coupled to one or more of the taps.

A directional awareness system may also be implemented with a directional coupler as disclosed in U.S. Application Ser. No. 61/043,581, incorporated herein by reference. The directional coupler provides both directional awareness and communication, and enables a station to receive PLC signals propagating in a selected direction on the power line segment, and also enables a station to transmit PLC signals in a selected direction on the power line segment. The directional coupler is described in more detail below.

Figure 3:
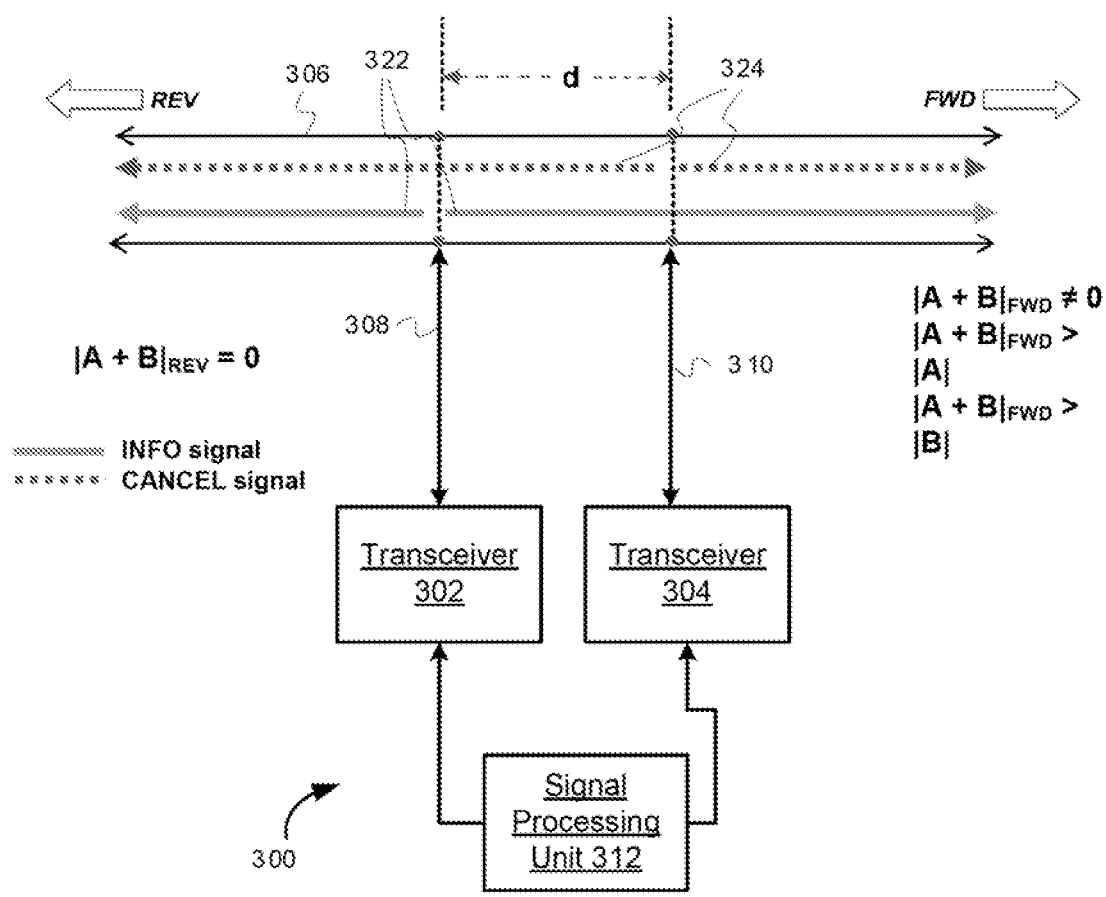
FIG. 3 is a schematic diagram of a power line directional coupler.

Referring to FIG. 3, a directional coupler 300 includes a first transceiver 302 and a second transceiver 304 coupled to a transmission line 306 (e.g., a power line) through respective taps. The tap 308 (or "tap A") for the first transceiver 302 and the tap 310 (or "tap B") for the second transceiver 304 are coupled to the transmission line 306 separated by a physical distance "d" along the power line of approximately ¼ of a wavelength at the center of the frequency band used for modulating signals. Equivalently, this separation distance is the distance at which a sinusoidal signal propagating from one tap to the other undergoes a phase shift due to propagation of 90 degrees. For example, for a PLC system operating at 30-50 MHz, the separation would be approximately 1.25 meters, assuming a propagation velocity on the power line of ⅔ the speed of light in a vacuum. Other systems may operate over other frequency ranges as high as 80 MHz, for example. At 80 MHz, a quarter wavelength tap spacing could be achieved at tap spacings as small as 0.63 meters. Tap spacings well under a quarter wavelength will still enable reliable determination of the direction of signal propagation. The spacing of the two taps at a distance of approximately a quarter wavelength at the center frequency of the band is used in some implementations because it enhances forward gain. However, other factors such as physical coupler size may dictate that the directional coupler is implemented with a tap spacing other than a quarter wavelength at center frequency, or may dictate making a determination of the direction of signal flow using only the highest frequencies in the signal rather than the center frequency.

Any of a variety of modulation schemes may be implemented by the synchronized transceivers 302 and 304, that convert data to and from a signal waveform that is transmitted over the communication medium (e.g., the power line 110). One exemplary modulation scheme is Orthogonal Frequency Division Multiplexing (OFDM). To illustrate how the directional coupler 300 functions, the operation of the system with an OFDM modulation scheme will be described in detail. First a the OFDM modulation scheme for signals coupled to and from an individual tap will be described to explain OFDM concepts, and then additional techniques for processing signals for the multi-tap directional coupler will be described.

In OFDM modulation generally, data are transmitted in the form of OFDM "symbols." Each symbol has a predetermined time duration or symbol time $T_s$. Each symbol includes a Guard Interval (to combat the effects of multipath distortion) and a Fast Fourier Transform (FFT) evaluation period ($T_{FFT}$). OFDM symbols are generated from a superposition of N sinusoidal waveforms that are orthogonal to each other over the period $T_{FFT}$ and form the OFDM subcarriers. Each subcarrier has a peak frequency $f_i$ and a phase $\Phi_i$ measured from the beginning of the symbol. For each of these mutually orthogonal subcarriers, a whole number of periods of the sinusoidal waveform is contained within the symbol time $T_{FFT}$. Equivalently, each subcarrier frequency is an integral multiple of a frequency interval $\Delta f=1/T_{FFT}$. The phases $\Phi_i$ and amplitudes $A_i$ of the subcarrier waveforms can be independently selected (according to an appropriate modulation scheme) without affecting the orthogonality of the resulting modulated waveforms. The subcarriers occupy a frequency range between frequencies $f_1$ and $f_N$ referred to as the OFDM bandwidth. The direction of signal propagation can be made using only a portion of the subcarriers, or even a single subcarrier. It would therefore be possible to determine the direction of signal propagation by analyzing only the subcarriers located at the highest frequencies in the communications channel, thereby enabling implementation of a an apparatus with much smaller tap spacings.

Figure 4:
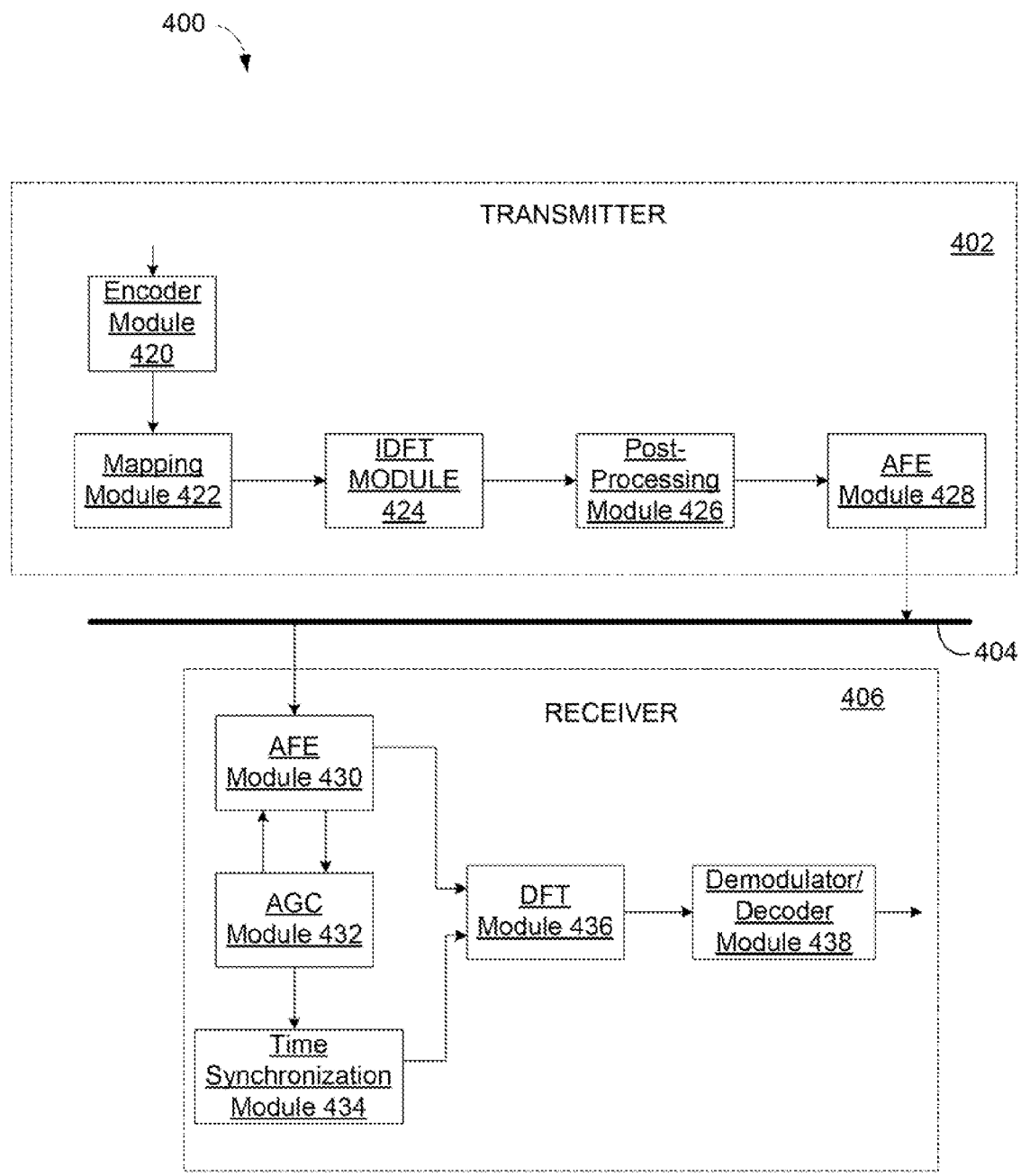
FIG. 4 is a block diagram of a communication system implementing an OFDM modulation scheme.

Referring to FIG. 4, a communication system 400 includes a transmitter 402 for transmitting a signal (e.g., a sequence of OFDM symbols) over a communication medium 404 to a receiver 406. The transmitter 402 and receiver 406 can both be incorporated into a network interface module at each station. The communication medium 404 can represent a path from one device to another over the power line network.

At the transmitter 402, modules implementing the physical (PHY) layer receive a data unit from the medium access control (MAC) layer. The data unit is sent to an encoder module 420 to perform processing such as scrambling, error correction coding and interleaving.

The encoded data is fed into a mapping module 422 that takes groups of data bits (e.g., 1, 2, 3, 4, 6, 8, or 10 bits), depending on the constellation used for the current symbol (e.g., a binary phase shift keyed (BPSK), quadrature phase shift keyed (QPSK), 8 point Quadrature Amplitude Modulated (8-QAM), 16-QAM, 64-QAM, 256-QAM, or 1024-QAM constellation), and maps the data value represented by those bits onto the corresponding amplitudes of in-phase (I) and quadrature-phase (Q) components of a subcarrier waveform of the current symbol. This results in each data value being associated with a corresponding complex number $C_i=A_i \exp(j\Phi_i)$ whose real part corresponds to the I component and whose imaginary part corresponds to the Q component of a subcarrier with peak frequency $f_i$. Alternatively, any appropriate modulation scheme that associates data values to modulated subcarrier waveforms can be used.

The mapping module 422 also determines which of the subcarrier frequencies $f_1, \ldots, f_N$ within the OFDM bandwidth are used by the system 400 to transmit information. For example, some subcarriers that are experiencing fades can be avoided, and no information is transmitted on those subcarriers. Instead, the mapping module 422 uses coherent BPSK modulated with a binary value from the Pseudo Noise (PN) sequence for that subcarrier. For some subcarriers (e.g., a subcarrier i=10) that correspond to restricted bands (e.g., an amateur radio band) on a medium 404 that may radiate power no energy is transmitted on those subcarriers (e.g., $A_{10}=0$). The mapping module 422 also determines the type of modulation to be used on each of the subcarriers (or "tones") according to a "tone map." The tone map can be a default tone map, or a customized tone map determined by the receiving station, as described in more detail below.

An inverse discrete Fourier transform (IDFT) module 424 performs the modulation of the resulting set of N complex numbers (some of which may be zero for unused subcarriers) determined by the mapping module 422 onto N orthogonal subcarrier waveforms having peak frequencies $f_1, \ldots, f_N$. The modulated subcarriers are combined by IDFT module 424 to form a discrete time symbol waveform S(n) (for a sampling rate $f_R$), which can be written as $$S(n) = \sum_{i=1}^{N} A_i \exp[j(2\pi i n/N + \Phi_i)] \qquad \text{Eq. (1)}$$

where the time index n goes from 1 to N, Ai is the amplitude and Φi is the phase of the subcarrier with peak frequency fi=(i/N)fR, and j=√−1. In some implementations, the discrete Fourier transform corresponds to a fast Fourier transform (FFT) in which N is a power of 2.

A post-processing module 426 combines a sequence of consecutive (potentially overlapping) symbols into a "symbol set" that can be transmitted as a continuous block over the communication medium 404. The post-processing module 426 prepends a preamble to the symbol set that can be used for automatic gain control (AGC) and symbol timing synchronization. To mitigate intersymbol and intercarrier interference (e.g., due to imperfections in the system 400 and/or the communication medium 404) the post-processing module 426 can extend each symbol with a cyclic prefix, or Guard Interval, that is a copy of the last part of the symbol. The post-processing module 426 can also perform other functions such as applying a pulse shaping window to subsets of symbols within the symbol set (e.g., using a raised cosine window or other type of pulse shaping window) and overlapping the symbol subsets.

An Analog Front End (AFE) module 428 couples an analog signal containing a continuous-time (e.g., low-pass filtered) version of the symbol set to the communication medium 404. The effect of the transmission of the continuous-time version of the waveform S(t) over the communication medium 404 can be represented by convolution with a function g(τ;t) representing an impulse response of transmission over the communication medium. The communication medium 404 may add noise n(t), which may be random noise and/or narrowband noise emitted by a jammer.

At the receiver 406, modules implementing the PHY layer receive a signal from the communication medium 404 and generate an data unit for the MAC layer. An AFE module 430 operates in conjunction with an Automatic Gain Control (AGC) module 432 and a time synchronization module 434 to provide sampled signal data and timing information to a discrete Fourier transform (DFT) module 436.

After removing the cyclic prefix, the receiver 406 feeds the sampled discrete-time symbols into DFT module 436 to extract the sequence of N complex numbers representing the encoded data values (by performing an N-point DFT). Demodulator/Decoder module 438 maps the complex numbers onto the corresponding bit sequences and performs the appropriate decoding of the bits (including deinterleaving and descrambling).

Referring back to FIG. 3, the directional coupler 300 implements a PHY layer modulation scheme, in this example OFDM, with the added feature suppressing the signal transmitted or received in one direction of propagation on the transmission line. The two transceivers 302 and 304 are controlled by a common signal processing unit 312. The signal processing unit 312 enables the signals transmitted and received by the transceivers 302 and 304 to be processed using common signal references, such as a common clock reference, which can be used to define a common phase reference for setting relative phases between the subcarriers, or subset of subcarriers used at the charging station for determining the direction of signal propagation, at the two transceivers. In some implementations, the signal processing unit 312 generates baseband signal characteristics such as amplitudes and phases to be used for modulating respective subcarrier frequencies in a multi-carrier modulation scheme (e.g., OFDM as described in more detail above and in U.S. Publication No. 2006/0256881 A1 and U.S. Application No. 60/941,949, each of which is incorporated herein by reference). For transmission, at tap A, an information bearing signal 322, designated INFO, is coupled onto the transmission line 306 by the first transceiver 302. At tap B, a second signal 324, designated CANCEL, with a predetermined relationship to the INFO signal is coupled onto the transmission line 306 by the second transceiver 304. For reception, the INFO and CANCEL signals are used to couple a signal propagating in a selected direction from the transmission line 306.

The purpose of the CANCEL signal 324 is to steer a directional null by interfering with the INFO signal 322 in one (e.g., REVERSE) direction while receiving a signal arriving from another (e.g., FORWARD) direction. Because of the predetermined physical distance between the signal taps and the predetermined phase relationships between subcarriers emanating from the signal taps, as described in more detail below, the two signals combine constructively in the desired (FORWARD) direction—thus providing gain in the FORWARD direction. For the purpose of illustration, assume that there are no major signal impairments or impedance mismatches in either the FORWARD or REVERSE directions. In this idealized situation, the CANCEL signal uses the same subcarrier amplitudes as the INFO signal with a predetermined phase shift (or "rotation") of each subcarrier of the OFDM signal such that the two signals nullify each other in the REVERSE direction. The exact phase rotation for each subcarrier is dependent on the distance, d, between the two signal taps, A 308 and B 310, and the frequency of the subcarrier.

The predetermined relative phase shift between subcarriers at tap A 308 and tap B 310 are established explicitly or implicitly based on a common phase reference at tap A and tap B. The transceivers 302 and 304 couple signals to and from the taps according to a common phase reference that is provided, for example, by the signal processing unit 312, or established by some technique for establishing a common phase reference (e.g., using synchronized clocks as described in U.S. Publication No. 2007/0025398 A1, incorporated herein by reference). For signal reception, dynamically controlled phase shifts between subcarriers generated at tap A and tap B, relative to this common phase reference, enable dynamically selectable cancellation in the REVERSE direction and constructive interference in the FORWARD direction. By switching the direction of FORWARD and REVERSE and comparing the resulting received signal strength, the (previously unknown) direction of an arriving signal propagating on the transmission line 306 can be determined.

An imposed relative phase shift β(λ) of a subcarrier of wavelength λ within the CANCEL signal 324 relative to the same subcarrier in the INFO signal 322 can be determined as follows. The phase shift Φ(λ) acquired due to signal propagation of the subcarrier over physical distance "d" is:

$$\Phi(\lambda) = 2\pi d/\lambda \qquad \text{Eq. (2)}$$

where λ is the wavelength of the subcarrier on the transmission line 306. Thus, the acquired phase shift is proportional to the distance between the taps divided by the wavelength of the subcarrier on the transmission line, or equivalently, proportional to the distance between the taps multiplied by frequency of the subcarrier where the frequency $f=v/\lambda$ (where $v$ is the propagation speed on the transmission line). (Typically, a subcarrier has a spectrum with a spectral shape that has a maximum value (or "peak") at a "peak frequency" and tapers off away from the peak frequency. For example, in OFDM modulation the subcarriers have a spectral shape that is approximately a sinc function. The wavelength or frequency of the subcarrier corresponds to the wavelength or frequency at a peak of the spectrum.) In the REVERSE direction, when the CANCEL subcarrier signal 324 propagating from tap B 310 (shown as the dashed line) reaches tap A 308, it is combined with the INFO subcarrier signal 322 propagating from tap A (shown as the solid line). The resulting combined signal will be cancelled if the sum of the imposed relative phase $\beta(\lambda)$ and the acquired relative phase shift $\Phi(\lambda)$ add to $\pi$ (or 180 degrees). The imposed relative phase shift $\beta(\lambda)$ for a given subcarrier (having a wavelength $\lambda$) in the CANCEL signal at Tap B is computed as:

$$\beta(\lambda)=\pi-\Phi(\lambda) \qquad \text{Eq. (3)}$$

In this case, the amplitude of the subcarriers in the CANCEL signal are identical to those in the INFO signal.

In the FORWARD direction, the INFO subcarrier signal 322 (shown as the solid line) starts propagating from tap A 308 with a phase shift of $-\beta(\lambda)$ relative to the same subcarrier in the CANCEL signal 324. When the INFO subcarrier signal reaches tap B 310, it is combined with the CANCEL signal propagating from tap B (shown as the dashed line) according to a total phase that is the sum of the initial relative phase shift $-\beta(\lambda)$ and the acquired relative phase shift $\Phi(\lambda)$, which adds to $\Phi(\lambda)-\beta(\lambda)$. For the subcarrier for which the distance d is $\lambda/4$, the acquired relative phase shift $\Phi(\lambda)$ is $\pi/2$ and the imposed relative phase shift $\beta(\lambda)$ is $\pi-\pi/2=\pi/2$. Thus, for this subcarrier, the INFO subcarrier signal is combined with the CANCEL subcarrier signal according to a total relative phase shift of zero, resulting in a doubling of the signal amplitude. For subcarriers for which $\lambda/4$ is less than or greater than the distance d, the INFO and CANCEL subcarrier signals are added with a nonzero relative phase $4\pi d/\lambda-\pi$, but still add constructively over a relatively large wavelength range.

The designation of which transceiver provides the "INFO" signals and which provides the "CANCEL" signals is arbitrary, such that the choice of direction in which signals are canceled and direction in which signals constructively add can be controlled dynamically depending on the desired direction of reception or transmission of a signal. To control the direction, the directional coupler 300 applies the appropriate relative phase shift by imposing a phase shift on either or both of the taps. For example, to switch directions, the INFO and CANCEL signals can each be applied to different taps such that the imposed phase shift $\beta(\lambda)$ is applied to the signal at tap A 308 instead of the signal at tap B 310. Equivalently, to switch directions, the INFO and CANCEL signals can be applied to the same taps with the sign of the imposed phase shift $\beta(\lambda)$ changed such that an imposed phase shift of $-\beta(\lambda)$ is applied to the signal at tap B. The direction in which a signal is cancelled will be called the REVERSE direction, but this direction may be dynamically controlled to be either direction on the transmission line (i.e., LEFT or RIGHT). It is also possible to linearly combine two different signals simultaneously in order to "listen" in both the FORWARD and REVERSE directions on the transmission line at the same time (e.g., if a recharging station is configured to receive signals from both a local vehicle and the authentication server at the same time).

Due to reciprocity, the null steering described above describes the behavior of the directional coupler 300 for transmitting signals and for receiving signals. The two signal taps A 308 and B 310 can be thought of as a linear array. An array factor that represents a gain for coupling signals between the transmission line 306 and an array of taps applies to both transmission gain and reception gain. A null (or at least a partial null—e.g., reduction of 20 dB or 50 dB or more) in the array factor can be provided in one direction on the transmission line while a useful signal level or even a gain greater than 0 dB or as high as 3 dB, for example, is provided in the other direction. The same imposed phase shifts as calculated above can be used to process signals received at the two taps to recover signals from one direction while blocking signals from the other direction. The signals received at each tap are processed to impose the required phase shifts using a programmable phase rotator on each subcarrier and the two resulting signals may be added together prior to demodulation to suppress and substantially cancel signals that are propagating on the transmission line in a one direction while passing or enhancing signals that are propagating the other direction on the transmission line. This enables the directional coupler to simultaneously receive two different signals from opposite directions on the transmission line.

Other implementations of the directional coupler 300 are possible. For example, in some implementations, a single transceiver can provide signals to and receive signals from both taps. In some implementations of the directional coupler, any number of taps (e.g., three or four or more) can be used to provide a dynamically controllable level of destructive interference to null or nearly null signals in one direction and provide non-nulling interference or constructive interference (gain) in the other direction. For example, more than two taps may be used to increase the effective bandwidth over which gain is provided in one direction while nulling the other direction. In some implementations, there is only a single carrier instead of multiple carriers (or "subcarriers").

Figure 5:
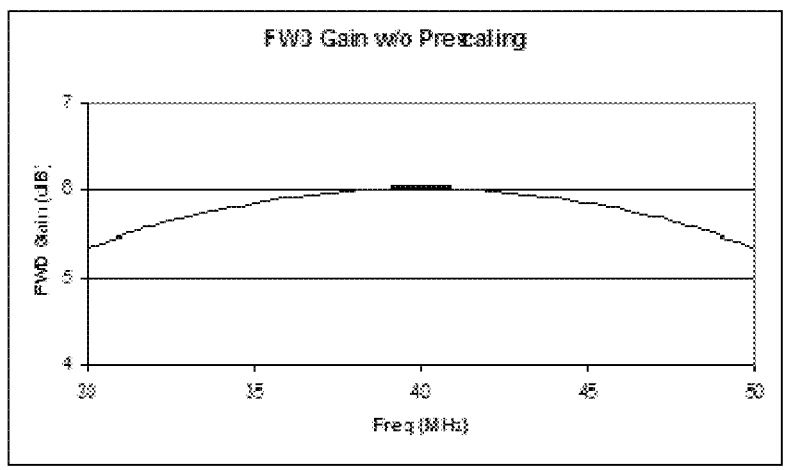
FIG. 5 is a plot of the frequency response of the power line directional coupler system in the forward transmission direction without pre-scaling of the subcarrier signals.

Referring to FIG. 5, if the CANCEL signal is adapted to maximize nulling in the REVERSE direction for each subcarrier within the signal bandwidth, signal gain in the FORWARD direction will not be uniform across the entire signal bandwidth. The INFO and CANCEL signal vectors will combine perfectly in phase on only one of the subcarrier frequencies (e.g., the center subcarrier frequency). Subcarriers not located at band center will have slightly less FORWARD gain. This results in an amplitude taper across the signal bandwidth in the FORWARD direction. FIG. 5 is a plot of signal gain in the forward direction, measured in decibels, as a function of frequency for system that does not use amplitude prescaling. The center subcarrier at 40 MHz experiences a forward gain of approximately 6 dB (3 dB of gain is due to the array factor and 3 dB is due to the fact that twice as much power is being injected into the system relative to a system using a single transceiver). Subcarriers at other frequencies closer to the edges of the signal bandwidth experience reduced forward signal gain due to amplitude taper.

This amplitude taper is generally undesirable because regulatory limits are imposed on transmitted power. If the signal at band center is held within regulatory limits, the signal at band edge will be further suppressed due to the aforementioned amplitude taper.

Figure 6:
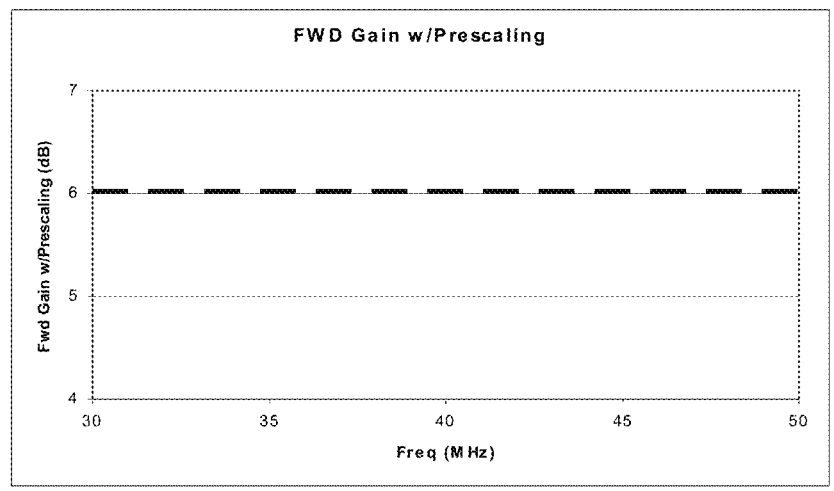
FIG. 6 is a plot of the frequency response of the power line directional coupler system in the forward transmission direction with pre-scaling of the subcarrier signals.

Referring to FIG. 6, the INFO signal may be prescaled in amplitude to compensate for this amplitude taper across the signal bandwidth. In this case, amplitude prescaling is accomplished by inverting the gain curve in FIG. 5 and normalizing gain at band center to 0 dB. When the prescaled signal is injected into the directional coupler, the result is an ideal flat gain across the entire signal bandwidth as shown in FIG. 6.

The fully implemented directional coupler can simultaneously receive signals from both directions of propagation. Thus, a charging station using a full directional coupler may monitor signals on the line from all PLC nodes and simply ignore or discard billing information received in signals propagating from the network toward its charging terminal.

Many other implementations other than those described above are within the invention, which is defined by the following claims.

What is claimed is:

1. An apparatus for coupling a charging station to a power line segment that is terminated at a first end by a charging terminal, the apparatus comprising:
multiple taps coupled to the power line segment; and
circuitry coupled to the charging station and coupled to the multiple taps, wherein the circuitry is configured to discriminate between a first communication signal propagating on the power line segment in a direction from the first end to a second end of the power line segment and a second communication signal propagating on the power line segment in a direction from the second end to the first end,
wherein the circuitry comprises a signal processing unit configured to
communicate with a first tap and a second tap of the multiple taps,
control a phase for at least a portion of a selected communication signal at the first tap relative to a phase for a corresponding portion of the selected communication signal at the second tap,
wherein the selected communication signal is selected from the first communication signal and the second communication signal.

2. The apparatus of claim 1, wherein as part of the signal processing unit configured to control the phase for at least the portion of the selected communication signal at the first tap, the signal processing unit is configured to determine the phase for at least the portion of the selected communication signal at the first tap based at least in part on a direction in which the selected communication signal is to be coupled between the multiple taps and the power line segment.

3. The apparatus of claim 1, wherein as part of the signal processing unit configured to control the phase for at least the portion of the selected communication signal for the first tap, the signal processing unit is configured to determine a sign of the phase for at least the portion of the selected communication signal at the first tap based at least in part on the direction of the selected communication signal.

4. The apparatus of claim 1, wherein the signal processing unit is further configured to control an amplitude of the portion of the selected communication signal from the first tap relative to an amplitude of the corresponding portion of the selected communication signal from the second tap.

5. The apparatus of claim 1, wherein the selected communication signal comprises multiple subcarriers, and the signal processing unit is configured to determine a phase for a subcarrier of the multiple subcarriers for the first tap relative to a phase for a corresponding subcarrier of the multiple subcarriers for the second tap.

6. The apparatus of claim 5, wherein the corresponding subcarrier for the second tap has a same frequency as the subcarrier for the first tap.

7. The apparatus of claim 5, wherein the signal processing unit is configured to determine an amplitude for the subcarrier for the first tap relative to an amplitude of the corresponding subcarrier for the second tap.

8. The apparatus of claim 1, further comprising multiple transceivers wherein one of the multiple transceivers is coupled to a respective one of the multiple taps and coupled to the signal processing unit.

9. The apparatus of claim 1, further comprising a transceiver coupled to the multiple taps and coupled to the signal processing unit.

10. The apparatus of claim 1, wherein as part of the signal processing unit configured to control the phase for at least the portion of the selected communication signal for the first tap, the signal processing unit is configured to control the phase to be approximately equal to a difference between a constant term and a term proportional to a frequency of the portion of the selected communication signal and a distance between the first tap and second tap.

11. The apparatus of claim 10, wherein the frequency of the portion of the selected communication signal corresponds to a frequency at a peak of a spectrum of the portion of the selected communication signal.

12. The apparatus of claim 10, wherein the portion of the selected communication signal comprises a subcarrier of the selected communication signal.

13. The apparatus of claim 10, wherein the distance between the first tap and the second tap is proportional to a center wavelength corresponding to a center of a bandwidth over which a spectrum of the selected communication signal spans.

14. The apparatus of claim 13, wherein the distance between the first tap and the second tap is approximately equal to the center wavelength divided by four.

15. The apparatus of claim 1, wherein as part of the signal processing unit configured to control the phase for the portion of the selected communication signal for the first tap, the signal processing unit is configured to determine a phase that provides at least a partial null in an array factor for the selected communication signal located between a power line segment and the first tap and the second tap in one direction on the power line segment.

16. The apparatus of claim 15, wherein the determined phase provides gain in the array factor for the selected communication signal located between the power line segment and the first tap and the second tap in an opposite direction on the power line segment.

17. The apparatus of claim 15, wherein the selected communication signal comprises multiple subcarriers, wherein the signal processing unit is configured to:
determine a signal strength for at least one subcarrier of the multiple subcarriers for a specified direction on the power line segment; and
determine amplitudes and phases for the at least one subcarrier for at least one tap of the multiple taps that provide at least a partial null in the array factor for the specified direction.

18. The apparatus of claim 15, wherein the signal processing unit is configured to receive the first communication signal and the second communication signal from the power line segment to the first tap and the second tap according to the array factor.

19. An apparatus for coupling a charging station to a power line segment that is terminated at a first end by a charging terminal, the apparatus comprising:
multiple taps coupled to the power line segment; and circuitry coupled to the charging station and coupled to the multiple taps, wherein the circuitry is configured to discriminate between a first communication signal propagating on the power line segment in a direction from the first end to a second end of the power line segment and a second communication signal propagating on the power line segment in a direction from the second end to the first end, wherein the circuitry comprises a signal processing unit configured to communicate with a first tap and a second tap of the multiple taps, wherein the signal processing unit is configured to:

determine a first set of phase values for processing at least one subcarrier of the first communication signal received from the first tap; and determine a second set of phase values for processing the at least one subcarrier of the second communication signal received from the second tap based on the first set of phase values.

20. The apparatus of claim 19, wherein the signal processing unit is configured to receive the first communication signal from the first tap and receive the second communication signal from the second tap at approximately a same time.

21. The apparatus of claim 20, wherein the signal processing unit is configured to:

process a subcarrier within the at least one subcarrier of the first communication signal using a phase value from the first set of phase values to recover a first vector;

process a corresponding subcarrier within the at least one subcarrier of the second communication signal using a phase value from the second set of phase values to recover a second vector; and combine the first vector and the second vector according to a relative phase to recover a data value.

22. The apparatus of claim 21, wherein the signal processing unit is configured to control the relative phase according to a direction in which the data value is being received from the power line segment coupled to the multiple taps.

23. An apparatus for coupling a charging station to a power line segment that is terminated at a first end by a charging terminal, the apparatus comprising:

multiple taps coupled to the power line segment; and circuitry in communication with the multiple taps, wherein the circuitry is configured to control a phase for at least a portion of a signal for a first tap of the multiple taps relative to a phase for a corresponding portion of the signal for a second tap of the multiple taps, wherein the circuitry comprises a first receiver coupled to the first tap and a second receiver coupled to the first tap and the circuitry configured to shift a phase of an output of at least one of the first receiver and the second receiver to control the phase for at least the portion of the signal for the first tap relative to the phase for the corresponding portion of the signal for the second tap.

24. The apparatus of claim 23, wherein the signal comprises a communication signal within a group of communication signals, wherein the circuitry is configured to discriminate between communication signals in the group of communication signals propagating on the power line segment in a direction from the first end to a second end of the power line segment and communication signals in the group of communication signals propagating on the power line segment in a direction from the second end to the first end.

25. The apparatus of claim 23, wherein the circuitry is further configured to control an amplitude of at least the portion of the signal for the first tap relative to an amplitude of the corresponding portion of the signal for the second tap.

26. The apparatus of claim 23, wherein the signal comprises multiple subcarriers, and the circuitry is configured to determine a phase for a subcarrier of the multiple subcarriers for the first tap relative to a phase for a corresponding subcarrier of the multiple subcarriers for the second tap.

27. The apparatus of claim 26, wherein the corresponding subcarrier for the second tap has a same frequency as the subcarrier for the first tap.

28. The apparatus of claim 26, wherein the circuitry is configured to determine an amplitude for the subcarrier for the first tap relative to an amplitude of the corresponding subcarrier for the second tap.

29. A method for coupling a charging station to a power line segment that is terminated at a first end by a charging terminal, the method comprising:

sensing a communication signal propagating on the power line segment and being coupled from multiple taps connected to the power line segment;

determining whether the communication signal is propagating on the power line segment in a direction from the first end to a second end of the power line segment or in a direction from the second end to the first end; and adjusting a phase of at least a portion of the communication signal detected at a first tap of the multiple taps relative to a phase of a corresponding portion of the communication signal detected at a second tap of the multiple taps to create a phase adjusted communication signal.

30. The method of claim 29, wherein the charging station is a vehicle charging station that provides power to a vehicle connected to the charging terminal.

31. The method of claim 29, wherein the communication signal includes billing information transmitted from a vehicle connected to the charging terminal.

32. The method of claim 29, wherein the second end is connected to a power distribution network.

33. The method of claim 32, wherein the communication signal includes billing information transmitted from a vehicle connected to the charging terminal.

34. The method of claim 32, wherein the communication signal includes billing information transmitted from a server connected to the power distribution network.

35. The method of claim 29, further comprising:

adding the phase adjusted communication signal from the first tap to the corresponding portion of the communication signal detected at the second tap to suppress communication signals propagating on the power line segment in the direction from the second end of the power line segment to the first end of the power line segment.

* * * * *